United States Patent

Scerbvo, III

[11] Patent Number: 6,086,006
[45] Date of Patent: Jul. 11, 2000

[54] EVIDENCE MAINTAINING TAPE RECORDING REELS AND CASSETTES

[76] Inventor: Frank C. Scerbvo, III, P.O. Box 5271, Parsippany, N.J. 07054

[21] Appl. No.: 08/740,390

[22] Filed: Oct. 29, 1996

[51] Int. Cl.⁷ .................................................. G11B 5/00
[52] U.S. Cl. ..................... 242/341; 242/342; 242/611.2; 242/613
[58] Field of Search .................. 242/340, 341, 242/342, 345, 358.1, 611.2, 613, 613.1

[56] References Cited

U.S. PATENT DOCUMENTS

| | | | |
|---|---|---|---|
| 1,775,610 | 9/1930 | Weiss | 242/611.2 |
| 2,925,164 | 2/1960 | Murphy | 242/611.2 |
| 3,201,059 | 8/1965 | Winkel | 242/613 |
| 3,275,257 | 9/1966 | Cherniavsky | 242/611.2 |
| 3,512,734 | 5/1970 | Priest . | |
| 3,532,287 | 10/1970 | Patton | 242/613 |
| 3,552,671 | 1/1971 | Wood | 242/340 |
| 3,734,052 | 5/1973 | Feldman . | |
| 3,833,109 | 9/1974 | Landgraf | 242/611.2 |
| 3,840,193 | 10/1974 | Feichtinger et al. | 242/611.2 |
| 3,857,531 | 12/1974 | Jantzen | 242/342 |
| 4,432,510 | 2/1984 | Ogata et al. | 360/94 |
| 4,515,331 | 5/1985 | Stumpfi et al. . | |
| 4,541,584 | 9/1985 | Stumpfi et al. | 242/342 |
| 4,629,140 | 12/1986 | LaCasse | 242/611.2 |
| 4,679,109 | 7/1987 | Okamura et al. | 360/132 |
| 5,308,013 | 5/1994 | Lee et al. | 242/340 |
| 5,400,185 | 3/1995 | Scerbo, III | 360/5 |
| 5,546,124 | 8/1996 | Scerbo, III | 348/158 |

FOREIGN PATENT DOCUMENTS

| | | | |
|---|---|---|---|
| 2 233 675 | 1/1975 | France | 242/345 |
| 561588 | 10/1932 | Germany | 242/611.2 |
| 410426 | 5/1934 | United Kingdom | 242/611.2 |

*Primary Examiner*—John P. Darling

[57] ABSTRACT

For use in obtaining and maintaining evidentiary integrity as admissible evidence of audio and/or video recorded factual events on a recording tape, feed and a take-up reels each has two paired separate female bearing surfaces. For each of the feed reel and the take-up reel when utilized in paired or cassette arrangement, one of the paired two female bearing surfaces is of a differing shape and/or dimension than the remaining one. One of the paired female bearing surfaces is permanently detachably from the other. The other of the paired female bearing surfaces is inaccessible for the spindle-gear driving thereof by a drive spindle prior to removal or detachment of the initially utilizable drive or feed surface(s). The feed reel removable female bearing surface has a different size or shape or inner diameter of the female bearing surface than that of the female bearing surface of the drive reel. Once removed, a removed one of paired female bearing surfaces is thereafter rendered defective for reinsertion into the reel. Non-official judicial or other removal of a removable female bearing surface destroys evidentiary integrity of recorded data on the drive reel tape.

41 Claims, 5 Drawing Sheets

FIG. 6   FIG. 11

EVIDENCE MAINTAINING TAPE RECORDING REELS AND CASSETTES

THE INVENTION

The description of the invention necessarily embodies critical consideration of each of prior art and background and objects of the invention, as follow.

A. Prior Art

A prior art search of: United States Patent Office Class 96.1 and 96.5.

While no relevant prior art was located, the sole patent found of interest is Stumpfi U.S. Pat. No. 4,515,331 issued May 7, 1985 having alternate rigid teeth and depressible spring-biased teeth depressible radially outwardly from any extended state inward position mountable on a small spindle to a depressed state mountable on a larger spindle that also is mountable by the remaining alternate teeth. That patent has no discernible bearing on nor relevance to the present invention.

B. Background

This invention arose from potential problems that could be confronted by presence or lack of judicial evidentiary integrity being retained for recorded events embodied on audio and/or video tapes taken typically by the present inventor's patent patented subject matter of U.S. Pat. No. 5,400,185 issued Mar. 21, 1995 entitled Evidence Recorder and method of securing, and U.S. Pat. No. 5,546,124 issued Aug. 13, 1996, former U.S. Ser. No. 08/489,380 filed Jun. 12, 1995. The present invention is directed to avoiding such potential problems enabling admission of such recorded tapes as admissible evidence in judicial proceedings.

The present invention accordingly includes as part of its objects, the creation of audio reel-tape(s) and/or video-audio combination tape(s) that are mounted on reels that inherently preclude the possibility of intentional tampering with or accidentally wiping-out or mutilating recorded evidence from a tape, initially and/or originally recorded data on such reel-mounted tapes, also each could occur. Such is avoided/obviated when utilized alone and/or more preferably as feed and drive (spindle) reels of tape cassette (s) designed and manufactured specifically for utilization with the reels, tapes and cassettes of the present invention.

C. Broad Invention

In the light of the foregoing prior art of background, the invention in its broadest embodiment, is an improvement on a tape-mounting reel having a core with first radially inwardly directed core structure defining (a) a first radially outwardly annularly circumscribing tape mounting structure having a first radially outwardly facing tape-receiving circumscribing surface thereof mountable of tape wound or windable thereon and (b) a first radially inwardly directed core female bearing hub structure mountedly interconnected to the radially outwardly annularly circumscribing tape mounting structure and engageable with and drivable by or rotatable with at-least one first revolvable spindle drive gear bearing surface of a tape recording machine such that the tape-mounting reel is revolvably drivable by or revolvably rotatable with at-least one first revolvable spindle drive gear bearing surface, and the at-least one first radially inwardly directed core female bearing hub structure having a first predetermined radius operatively mountable on a prior art commercially standardized tape player spindle drive gear bearing surface and inner radius of the standardized tape player drive gear bearing surface.

The improvement in the aforenoted tape-mounting reel encompasses some parts of the prior tape-mounting rule to the extent aforenoted. The broad improvement thereof includes as a combination the following.

The aforenoted core has:

(a) a second radially outwardly annularly circumscribing tape reel support structure being by intermittent attachment structure (and mechanism thereof) retainably connected to and supported by and permanently detachable from and substantially non-reattachable to the radially outwardly facing tape-receiving circumscribing surface; and (b) second radially inwardly directed core female bearing structure that is at-least one of:

1) engageable with and drivable by, or
2) rotatable with at-least one engageable second revolvable spindle drive gear bearing surface such that the first tape mounting reel is revolvably drivable by or drivable with the at-least one engageable second revolvable spindle drive gear bearing surface when the second radially inwardly directed core female bearing structure is engageably mounted on the at-least one engageable second revolvable spindle drive gear bearing surface.

The second radially inwardly directed core female bearing structure has a differing mountable design feature and mechanism thereof from that of the first radially inwardly directed core female bearing structure.

As a first preferred embodiment of the aforenoted broad invention, the aforenoted improvement further includes the differing design feature and mechanism thereof as follows.

The second predetermined radius is of lesser radius dimension than the first predetermined radius.

In a second preferred embodiment, the improvement further includes the second radially inwardly directed core female bearing structure being detachably se parable from the second radially outwardly annularly circumscribing tape mounting structure; by this arrangement, after separation therefrom the first radially inwardly directed core female bearing structure is thereby enabled to be placed in a meshing and drivable contact with the first revolvable spindle drive gear bearing surface.

In a third preferred embodiment, an improvement on the second preferred embodiment is the second radially inwardly directed core female bearing structure having a shape and radius size of a conventionally utilized video tape reel design.

In a fourth preferred embodiment, an improvement on the first preferred embodiment is the second radially inwardly directed core female bearing structure having a shape and radius size of a conventionally utilized video tape reel design.

In a fifth preferred embodiment, the improvement further includes the first radially inwardly directed core female bearing structure having a shape and radius size of a conventionally tape reel design.

In a sixth preferred embodiment, the improvement further includes the first radially inwardly directed core female bearing structure having a shape and radius size of a conventional utilized audio tape reel design.

In a seventh preferred embodiment, the improvement further includes cassette tape-reel mounting and recording machine embodying the aforenoted broadly described generic tape-mounting reel, in which this seventh preferred embodiment further includes at least:

a) a tape-mountable tape feed-reel revolvable spindle gear bearing surface mountable and revolvable of the second radially inwardly directed core female bearing structure; and b) a tape-mountable tape receivable-reel revolvably-drivable spindle drive gear bearing surface; and c) a first one of the tape-mounting reel; and d) a second one of the tape-mounting reel.

In an eighth preferred embodiment embodying the aforenoted cassette tape-reel mounting and recording machine and the aforenoted tape-mounting reel of the aforenoted first preferred embodiment, the improvement further includes:

a) a tape-mountable tape feed-reel revolvable spindle gear bearing surface mountable and revolvable of the second radially inwardly directed core female bearing structure; and b) a tape-mountable tape receivable-reel revolvably-drivable spindle drive gear bearing surface; and c) a first one of the tape-mounting reel; and d) a second one of the tape-mounting reel.

In a ninth preferred embodiment embodying the aforenoted cassette tape-reel mounting and recording machine and the tape-mounting reel of the aforenoted second preferred embodiment, the improvement further including:

a) a tape-mountable tape feed-reel revolvable spindle gear bearing surface mountable and revolvable of the second radially inwardly directed core female bearing structure; and b) a tape-mountable tape receivable-reel revolvably-drivable spindle drive gear bearing surface; and a first one of the tape-mounting reel; and c) a second one of the tape-mounting reel; and d) in the first one of the tape mounting reel, the first radially inwardly directed core female bearing hub structure being of a different diameter than the second radially inwardly directed core female bearing surface.

In a tenth preferred embodiment as an improvement on the ninth preferred embodiment, there is included that the first radially inwardly directed core female bearing structure has jointly a shape and radius of a conventionally utilized video tape reel design.

In an eleventh preferred embodiment as an improvement on the tenth preferred embodiment, the first radially inwardly directed core female bearing structure has jointly a shape and radius of a conventionally utilized audio tape reel design.

In a twelfth preferred embodiment of a cassette tape-reel mounting and playing machine, as an improvement on the tape-mounting reel the broad embodiment, there are included:

a) a tape-mountable tape feed-reel revolvable spindle gear bearing surface mountable and revolvable of the second radially inwardly directed core female bearing structure; and b) a tape-mountable tape receivable-reel revolvably-drivable spindle drive gear bearing surface; and a first one of the tape-mounting reel; and c) a second one of the tape-mounting reel.

In a thirteenth preferred embodiment of the cassette tape-reel mounting and playing machine and the tape-mounting reel of the second preferred embodiment, the improvement further including:

a) a tape-mountable tape feed-reel revolvable spindle gear bearing surface mountable and revolvable of the second radially inwardly directed core female bearing structure; and b) a tape-mountable tape receivable-reel revolvably-drivable spindle drive gear bearing surface; and c) a first one of the tape-mounting reel; and d) a second one of the tape-mounting reel.

In a fourteenth preferred embodiment of the cassette tape-reel mounting and playing machine and the tape-mounting reel of the third preferred embodiment, the improvement further includes the first radially inwardly directed core female bearing structure having jointly a shape and radius of a conventionally utilized video tape reel design.

In a fifteenth preferred embodiment of cassette tape-reel mounting and playing machine and the tape-mounting reel of the third preferred embodiment, the improvement further includes the first radially inwardly directed core female bearing structure having jointly a shape and radius of a conventionally utilized audio tape reel design.

In a sixteenth preferred embodiment of the tape-mounting reel of the aforenoted broadest embodiment, the intermittent attachment structure (and mechanism thereof) comprises weak fracturable joining structure attaching the second radially outwardly annularly circumscribing tape mounting structure to the radially outwardly facing tape-receiving circumscribing surface.

In a seventeenth preferred embodiment of the tape-mounting reel of the aforenoted second preferred embodiment, the intermittent attachment structure (and mechanism thereof) comprises weak fracturable joining structure attaching the second radially outwardly annularly circumscribing tape mounting structure to the radially outwardly facing tape-receiving circumscribing surface.

In an eighteenth preferred embodiment as a further improvement on the tape-mounting reel of the seventh preferred embodiment, the intermittent attachment structure (and mechanism thereof) comprises weak fracturable joining structure attaching the second radially outwardly annularly circumscribing tape mounting structure to the radially outwardly facing tape-receiving circumscribing surface.

In a nineteenth preferred embodiment as a further improvement on the tape-mounting reel of the ninth preferred embodiment, the intermittent attachment structure (and mechanism thereof) comprises weak fracturable joining structure attaching the second radially outwardly annularly circumscribing tape mounting structure to the radially outwardly facing tape-receiving circumscribing surface.

In a twentieth preferred embodiment as a further improvement on the tape-mounting reel of the twelfth preferred embodiment, the intermittent attachment structure (and mechanism thereof) comprises weak fracturable joining structure attaching second radially outwardly annularly circumscribing tape mounting structure to the radially outwardly facing tape-receiving circumscribing surface.

In a twenty-first preferred embodiment as a further improvement in the tape-mounting reel of the thirteenth preferred embodiment, the intermittent attachment structure (and mechanism thereof) comprises weak fracturable joining structure attaching the second radially outwardly annularly circumscribing tape mounting structure to the radially outwardly facing tape-receiving circumscribing surface.

In a twenty-second preferred embodiment as a further improvement on the aforenoted broad invention, the intermittent attachment structure (and mechanism thereof) comprises radially-inwardly friction-fit structure of the second radially outwardly annularly circumscribing tape mounting structure having retainably wedged thereagainst radially-outwardly friction-fit structure of the radially outwardly facing tape-receiving circumscribing surface.

In a twenty-third preferred embodiment as a further improvement on the improvement of the second preferred embodiment, the intermittent attachment structure (and mechanism thereof) comprises radially-inwardly friction-fit structure of the second radially outwardly annularly circumscribing tape mounting structure having retainably wedged thereagainst radially-outwardly friction-fit structure of the radially outwardly facing tape-receiving circumscribing surface.

In a twenty-fourth preferred embodiment as a further improvement on the improvement of the seventh preferred embodiment, the intermittent attachment structure (and mechanism thereof) comprises radially-inwardly friction-fit structure of second radially outwardly annularly circumscribing tape mounting structure having retainably wedged thereagainst radially-outwardly friction-fit structure of the radially outwardly facing tape-receiving circumscribing surface.

In a twenty-fifth preferred embodiment as a further improvement on the improvement of the ninth preferred embodiment, the intermittent attachment structure (and mechanism thereof) comprises radially-inwardly friction-fit structure of the second radially outwardly annularly circumscribing tape mounting structure having retainably wedged thereagainst radially-outwardly friction-fit structure of the radially outwardly facing tape-receiving circumscribing surface.

In a twenty-sixth preferred embodiment as a further improvement on the twelfth preferred embodiment, the tape-mounting reel of the twelfth preferred embodiment, the intermittent attachment structure (and mechanism thereof) comprises radially-inwardly friction-fit structure of the second radially outwardly annularly circumscribing tape mounting structure having retainably wedged thereagainst radially-outwardly friction-fit structure of the radially outwardly facing tape-receiving circumscribing surface.

In a twenty-seventh preferred embodiment as a further improvement on the thirteenth preferred embodiment, the tape mounting reel of the thirteenth preferred embodiment, the intermittent attachment structure (and mechanism thereof) comprising radially-inwardly friction-fit structure of the second radially outwardly annularly circumscribing tape mounting structure having retainably wedged thereagainst radially-outwardly friction-fit structure of the radially outwardly facing tape-receiving circumscribing surface.

A twenty-eighth preferred embodiment as an improvement on the broad invention, includes: a) a feed spindle mountable and feedable of the tape-mounting reel of the aforestated broad invention and b) a reel-drive mechanism consisting of a drive mechanism driveably connected exclusively to a tape-receiving reel-drive spindle.

A twenty-ninth preferred embodiment, as a further improvement on the first preferred embodiment, includes: a) a feed spindle mountable and feedable of the tape-mounting reel of the aforestated first preferred embodiment and b) a reel-drive mechanism consisting of a drive mechanism driveably connected exclusively to a tape-receiving reel-drive spindle.

A thirtieth preferred embodiment, as a further improvement on the second preferred embodiment includes: a) a feed spindle mountable and feedable of the tape-mounting reel of the aforestated second preferred embodiment and b) a reel-drive mechanism consisting of a drive mechanism driveably connected exclusively to a tape-receiving reel-drive spindle.

A thirty-first preferred embodiment, as a further improvement on the third preferred embodiment includes: a) a feed spindle mountable and feedable of the tape-mounting reel of the aforestated third preferred embodiment and b) a reel-drive mechanism consisting of a drive mechanism driveably connected exclusively to a tape-receiving reel-drive spindle.

A thirty-second preferred embodiment, as a further improvement on the fourth preferred embodiment includes: a) a feed spindle mountable and feedable of the tape-mounting reel of the aforestated fourth preferred embodiment and b) a reel-drive mechanism consisting of a drive mechanism driveably connected exclusively to a tape-receiving reel-drive spindle.

A thirty-third preferred embodiment, as a further improvement on the fifth preferred embodiment, includes: a) a feed spindle mountable and feedable of the tape-mounting reel of the aforestated fifth preferred embodiment and b) a reel-drive mechanism consisting of a drive mechanism driveably connected exclusively to a tape-receiving reel-drive spindle.

A thirty-fourth preferred embodiment, as a further improvement on the sixth preferred embodiment includes: a) a feed spindle mountable and feedable of the tape-mounting reel of the aforestated sixth preferred embodiment and b) a reel-drive mechanism consisting of a drive mechanism driveably connected exclusively to a tape-receiving reel-drive spindle.

A thirty-fifth preferred embodiment, as an improvement on the broad invention, includes a feed spindle mountable and feedable of the tape-mounting reel of the aforestated broad invention and a reel-drive mechanism consisting of a drive mechanism driveably connected exclusively to a tape-receiving reel-drive spindle.

In a thirty-sixth preferred embodiment, the tape-mounting reel of the first preferred embodiment in which the improvement further includes: a) two of said tape-mounting reel as a feed reel and as a drive reel; and b) a recording tape embodying recording structure (and mechanism thereof) (typically cassette recorder of appropriate prior art structure (s) and mechanism thereof) for recording at-least one of audio and video data, and having a feed-end nondetachably anchored to said feed reel end and a drive end nondetachably anchored to said drive reel.

In a thirty-seventh preferred embodiment, the tape-mounting reel of the second preferred embodiment in which the improvement further includes: a) two of said tape-mounting reel as a feed reel and as a drive reel; and b) a recording tape embodying recording structure (and mechanism thereof) (typically cassette recorder) for recording at-least one of audio and video data, and having a feed-end nondetachably anchored to said feed reel end and a drive end nondetachably anchored to said drive reel.

A thirty-eighth preferred embodiment on the broad invention, includes a break-away inner tape reel core structure (and mechanism thereof), for forceably breaking-away reel break-away core-mounting structure, including reel core aperture threading structure and pressure exertable broadened structure non-passable through the reel core aperture, exertable of break-away pressure onto the break-away inner tape reel core-mounting structure.

In a thirty-ninth preferred embodiment as an improvement on the thirty-eighth preferred embodiment, there is included a pressing structure (and mechanism thereof) for exerting sufficient pressure, when pressed downwardly, against a top face of a reel mounted on the reel core aperture threading structure, as to cause the pressure exertable broadened structure to break-away the break-away inner tape reel core-mounting structure.

In a fortieth preferred embodiment as an improvement on the thirty-eighth preferred embodiment, there is provided sufficient storage space (room) of space-dimensions sufficient for storage of a tape or cassette reel therein when mounted on one of said the reel core aperture threading structure, as to be utilized for storage of a tape reel or cassette reel.

In a forty-first preferred embodiment as an improvement on the thirty-eighth preferred embodiment, there are provided a plurality of first and second space-apart ones of the aforedescribed reel core aperture threading structure and the pressure exertable broadened structure. The first and second spaced-apart ones are spaced-apart a distance corresponding to distances between the drive and feeder core spaces of the cassette reels of the aforedescribed invention, such that the break-away inner core spindle-mounting structures are concurrently/simultaneously removable when pressure is applied to the upper face of the mounted cassette reel.

D. BRIEF DESCRIPTION OF THE DRAWINGS

FIG. 7 diagrammatically and symbolically illustrates in elevation plan view, a novel audeo-vidio recorder and novel driver reel and feeder reel and novel drive and feeder spindle gears thereof in a novel combination with each other and together with conventional recording circuitry, conventional recording head(s), conventional recording tape, conventional driving mechanism such as driving belt and driving gear and driven gear and motor and battery and microphone and video camera and various circuitries thereof circuitry, and the like.

E. DETAILED DESCRIPTION OF THE INVENTION

The evidence recorder and method of securing disclosed in U.S. Pat. No. 5,400,185 and the sidearm handgun holster-mounted surveillance recorder carrier vessel of U.S. Pat. No. 5,546,124 as tamper-proof devices, in so far as ultimate securing still have a potential weak link in avoiding potential problems in maintaining the integrity of evidence ultimately reaching a courtroom. That potential problem arises from one or more of the following:

1. A rewound pre-recorded substrate/tape/cassette could be inadvertently placed into the aforenoted patented device (s) for recording thereon and thereafter recording obliterating prior valuable evidence;

2. A partially pre-recorded substrate/tape/cassette could be placed into one of the aforenoted patented device(s) potentially resulting in mixing unrelated evidence and/or recording over all or some portion thereof;

3. A substrate/tape/cassette could be placed into one of the aforenoted patented device(s) backwards, thereby accidentally obliterating or destroying prior valuable evidence;

4. Recording on both sides of the substrate tape could accidentally occur, with thereby an obliterating or destroying of prior valuable evidence;

Part of the solution is the present invention utilization of a specially designed substrate/tape that is compatible solely with the aforenoted patented device(s). Thereby there is substantially precluded the possibility of accidental insertion of a conventional substrate/tape/cassette into a recorder of the type(s) of aforenoted patented device(s). Consistent with such avoidance, in the present invention a particular recorder is/are uniquely different in its feed and/or drive spindle(s) of the reel or cassette—not subject to intentionally nor accidentally to be rewound by a non-rewind capability of the recorder, nor for rewinding in any other rewind machine and/or recorder and/or cassette player prior to the mounting-core (i.e. the feed and/or drive male and/or female mounting/anchoring structures for mounting the reel onto a convention and/or other feed and/or drive structure(s), having been irreversibly altered and/or modified so as to no longer be utilizable (mountable) on nor by the inventive recorder of the present invention.

Thereby the present invention provides for preserving indisputable proof(s) and/or evidence of admissible integrity for court utilization thereof.

It utilizes novel core(s) integrally a part thereof for the driver and/or feed spindles "prior to" modification—i.e. alteration, thereof as necessary to make its compatible with and/or utilizable functionally with or by conventional and/or other recorders inconsistent with this invention, making the evidence-bearing tape(s) of the reel(s)/cassette(s)/tape(s) of this invention utilizable solely and exclusively with the novel spindles/cores of the present invention as described herein—that are utilized solely and exclusively for the recording device of this invention.

The present invention eliminates and precludes the possibility of a prerecorded and/or of a partially-prerecorded substrate or tape from being initially and/or subsequently reinserted into the device subsequent to the modification or alteration of that tape's reel or spindle or core/cassette as set-forth herein which alteration would render it not receivable by nor operational within the recorder of the present invention. Such averts the possibility of creating and/or modifying tainted and/or false evidence and/or testimony.

The present invention eliminates and precludes the possibility of accidental insertion backwards of an initial fresh tape/reel/cassette into the recorder of this invention, i.e. precludes its insertion non-functionally backwardly.

Likewise, the present invention eliminates and precludes the possibility of insertion up-side-down of the tape/reel/cassette.

Likewise, the present invention eliminates and precludes the possibility of recording on both sides of the tape/reel/cassette.

The invention provides/permits the altering of the core/spindle of the tape/reel/cassette such that thereafter it may be rewound and "played-back on a typically conventionally designed tape player and/or cassette, but will not fit on nor be thereupon receivably mountable on the recorder of this invention.

Accidental remounting of a recorded tape onto the recorder of this invention is precluded because it cannot be rewound on the recorder of this invention, and can be rewound on some other recorder or cassette player solely after the aforenoted alteration of the core and/or spindle and/or cassette reel making it no longer remountable on the recorder of this invention but mountable of a conventional recorder and/or cassette player.

The recorder of this invention encompasses and includes as might be desirable and advantageous any of conventional technology in mechanics, electronics one or both thereof as currently available in today's technology, and/or by equivalents thereof.

For example, it is contemplated to utilize drive gears (capstan) on the recording device(s) of this invention, that is/are compatible solely with the substrate/tape/reel/cassette spool-hub gears. This eliminates a conventional substrate/tape/reel/cassette from being inserted into the recording device(s) of this invention.

The present invention utilizes "drive" gear(s) (capstan) and recording device(s)/elements that are of different sizes. For example, one gear would typically be 5/16 inch and the other gear concurrently would typically be 3/16 inch. This would prevent the substrate/tape/reel/cassette from being inserted into the recording device/cassette machine-recorder backwards/backwardly.

The present invention utilizes a substrate/tape/reel/cassette having spool "hub" gear(s) that are of different sizes. For example, one spool hub gear would typically be 5/16 inch and the other spool hub gear would typically be 3/16th inch, which likewise prevent the substate/tape/reel/cassette from being inserted backwards into the recording/cassette machine-recorder.

It is also contemplated and a part of this invention, to alternatively and/or concurrently utilize off-centered hub gear(s) of the substrate/tape/reel/cassette spool hub gear that therefore will not engage nor fit with the drive gears/capstan of the recording device(s) (of this invention) if inserted upside-down. This prevents the substrate/tape/reel/cassette from being inserted into the device(s) of this invention upside-down.

It is also contemplated and a part of this invention to alternatively and/or concurrently utilize substrate/tape/reel/cassette spool hub gears(s) that can be altered after recording is completed. After the alteration, the substrate/tape/reel/cassette will fit into a conventional unit for playing purposes.

It is also contemplated and a part of this invention to alternatively and/or concurrently utilize a multi-piece (such as a two-piece) substrate/tape/reel cassette spool hub gears (s) and/or core thereof, such that typically an outer section is attached to the tape and the inner section engages the recording drive gears (capstan). Alteration (removal) of the inner section will result in the convention design remaining that will and/or does fit a conventional tape and/or cassette player for the playing of the recorded data.

It is also contemplated and a part of this invention to alternatively and/or concurrently utilize a single piece substrate/tape/reel/cassette spool hub gear capable of being altered after recording is complete. The alteration will result in the gear adopting the conventional design of tape player (s) and/or cassette player(s).

It is also contemplated and a part of this invention to alternatively and/or concurrently utilize one or more of a tape/substrate/reel/cassette that is/are alterable from a non-conventional size and/or configuration to (after the recording is completed) irreversibly to a conventional size and/or configuration. It is also by this invention contemplated that a special tool and/or gadget or device (casing or otherwise) may mechanically be applied to the original core structure or the like (any one or more of alternative aforenoted) to press and/or pull and/or shear and/or break structure to result in the/a conversion to a design and/or shape thereafter functionally mountable and playable of the recorded data in a conventional tape player and/or cassette. Typical thereof is a box-like casing into which after recording, the tape/reel/cassette may be inserted or laid into an open casing with a lid, and upon closing and/or press-mounting the lid, the tape/reel/cassette thereupon becomes altered to the conventional remaining shape and form receivable by and playable by a conventional tape player and/or conventional cassette.

It is also contemplated and a part of this invention to alternatively and/or concurrently utilize one or more of a tape/substrate/reel/cassette that is/are utilizable of a tape-imparting electronic (or conventional or equivalent other) "signature" that when examined reveals whether or not there has been a previously-recorded one or more word or images removed electronically and/or mechanically and/or addition (s) subsequently made to the original recorded evidence—such being conventional well known technology at the time of this invention. Such addition to the aforedescribed inventions and various embodiments thereof, complements and enhances the overall achievable value as greater combination(s). The tape utilized in this invention is recordable preferably and normally on solely one side thereof, such moreover providing ample space receivable of electronic and/or mechanical signature(s) thereof aforenoted.

It is also contemplated to utilize concurrently any one or more of the aforenoted alternatives, to a result in a further improved combination(s).

In combination with one or more of the embodiments of the aforestated mechanical combinations, the improved utility of use thereof in effective maintaining of evidentiary integrity of recorded evidence on a tape thereof, a procedure (method) of altering the configuration from the inventive shape and/or form to the conventionally utilizable form and/or shape playable on a conventional tape and/or cassette player, solely when within the presence of a police or other reliable evidence-maintaining integrity-person (s), is preferred; such avoids destroying its value as credible irrefutable evidence.

For the foregoing FIGS. 1 through 6, the inventive elements are described more fully below.

Figure 1:
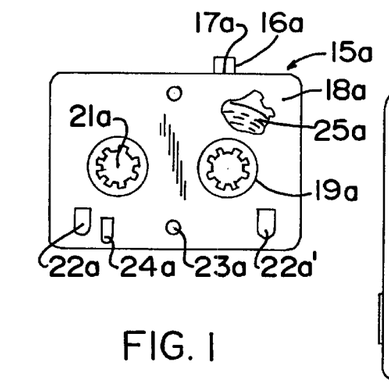
FIG. 1 diagrammatically and symbolically illustrates in elevation plan view, a broad-face of a cassette tape units of a conventional type to which the present invention is directed, apart from the reels differing shapes and differing dimensions of non-aligned feed and take-up spaced-apart reels and alterable mounting structure of variable inside diameters of reel(s)-mounting structures in accord with various embodiments of the invention. Each reel thereof illustrates a removable inside diameter-forming structure and outer standard non-removable key shapes (and/or structure(s)).

FIG. 1 illustrates in elevation plan view a broad-face 5 of a conventional cassette tape unit and structure 1 having typically mounted drive reel 2a mounted drivably on reel-driving member (spindle) 3a, and following (rotatably-pulled) reel 2b mounted on a non-driven rotatable member 3b—typically having a conventional drag mechanism (not illustrated) to keep taut a feed film being fed therefrom. The novel aspects of this illustrated reel lies in several aspects thereof. One difference is the novel differing shapes and differing dimensions and of the fact of non-alignment of the spaced-apart feed reel 2b and drivable take-up spaced-apart reel 2a—relative to the cassette length axis 4 of the cassette. A second illustrated novel difference is the presence of alterable (modifiable) reel-mounting structure(s) 2aa and 2ba respectively of variable inside initial diameters 3aa and 3ab respectively of initial reel(s)-mounting structures 2aa and 2ba respectively in accord with various embodiments of the invention, and remaining after-alteration diameters 3bb1 and 3bb2' respectively of structures 2a and 2b. Each reel thereof illustrates a removable inside diameter-forming aforenoted structures 2aa and 2ba respectively and the outer standard non-removable shaped keys 2a1 and 2b1 (and/or structures(s)) taken with the interconnecting permanent structure 2a2 and 2b2 between the respective shaped keys 2a1 and respective shaped keys 2b1. Mounted drive reel 2a as contrasted to following reel 2b, differ from one another in at-least relative diameters in the radially inner positioned driving members's (driving spindles) aforenoted 3aa and 3ab in comparison to one-another. As a result of the aforenoted non-alignment of the cassette reels 2a and 2b, the cassette 1 cannot be accidentally mounted backwardly in the cassette playing mounting structure(s), as well as preferably there being required a separate rewind tape reel mounting structure and mechanism thereof in order to rewind. Absence of rewind capability of cassette playing otherwise typical y conventional structure and mechanism, avoids the possibility of accidentally partially or fully rewinding a partially or fully already recorded tape carrying evidentiary recorded data. For the wedge type structure 2aa illustrated in each of this FIG. 1 and also larger view thereof FIG. 4, while it is important that the wedge-fit thereof be sufficiently tight and difficult both to mount and to subsequently remove as to make it impractical if not virtually impossible to remove and/or reinsert with merely the fingers nor easily with pliers or the like, on the other hand it is important that the wedge securing thereof be reasonably removable following completion of recording on the tape of the cassette. In that spirit and to accomplish such goals, the "fit" of elongated linear edges of the insert 2aa when mounted against the gear keys 2a1 in a preferred embodiment do not run parallel to nor in constant contact with one or more linear edges of the gear keys 2a1 nor the linear edges 2a2 of the radially outwardly extending gear structure; instead in the preferred embodiment of this wedge embodiment, the edges of the linear sides are wedges substantially solely against "corners" (i.e., limited contact) of the gear keys at insert portions 2aa2. Likewise, the same holds true for the further contacts with the radially inward face of radially outwardly extending gear structure 2a2 by the insert pointed portions 2aa1. Thereby, by virtue of the large multiplicity of substantially equally spaced-apart wedge contacts, the member/insert 2aa is securely wedged for proper operation as drivable by a (in this instance) hexagonal drive gear spindle gear ) drivingly fitting within the (in this instance) hexagonally shaped gear drivable structure 3a formed by interconnected six inner faces 2d as shown in FIG. 1, and in phantom for the hexagonal driving gear (spindle).

Figure 2:
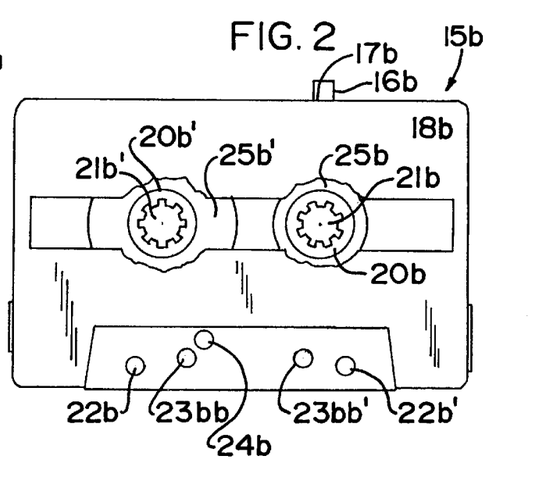
FIG. 2 diagrammatically and symbolically illustrates a tape-viewable edge-side of a cassette tape unit of a conventional type to which the present invention is directed, including typically embodiments embodying one or more inventive features of the FIG. 1 embodiment.

FIG. 2, as taken along line 2—2 of FIG. 1, illustrates a tape viewable edge-side of that cassette tape unit of a conventional type to which the present invention is directed, including typically embodiments embodying one or more inventive features of the foregoing FIG. 1 embodiment. There is shown in the cut-away the following gear 3b having a diameter 3' and the cassette casing 21 and the combination of drive gear (spindle) and recording mechanism, cummulatively designated 23, and cassette recording side face 18 and the conventional electronically coded (encoded) edge portion 19 of the recording tape 22, and casing upper through space (casing hole).

Figure 3:
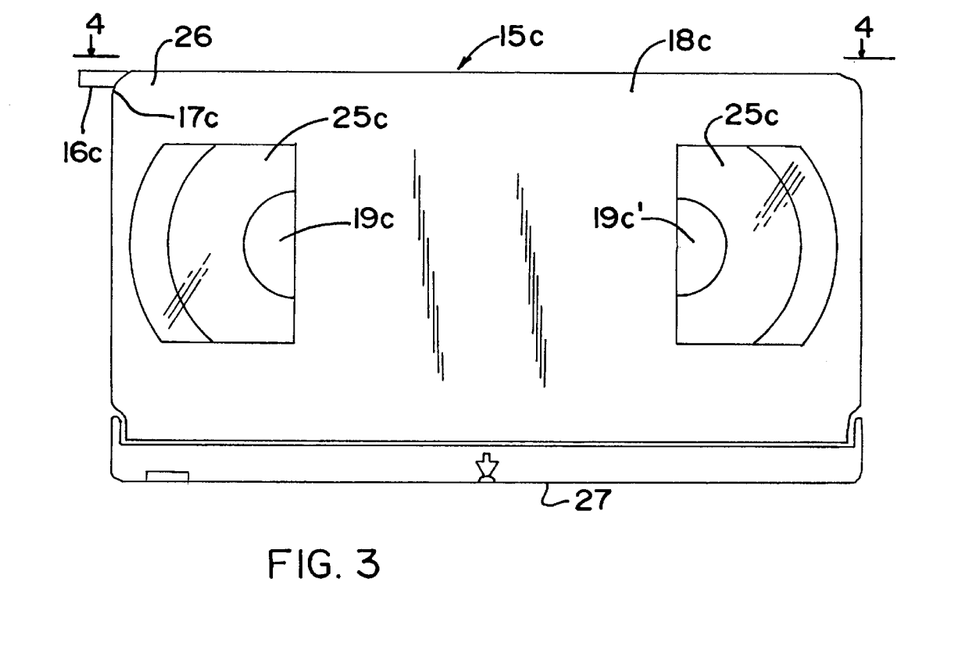
FIG. 3 diagrammatically and symbolically illustrates in part a broad-face of a cassette typically of the design and shape embodying one or more of the inventive features of FIG. 1, here illustrating an in-part portion thereof having an integral but break-away core-mounting structure defining a smaller core mounting-aperture (through-space) which when broken away leaves a larger non-break-away core-mounting aperture (through-space) mountable on a conventional tape player and/or rewinder, and/or other rewinder and player having feed and take-up reels aligned to correspond to the positioning of the recording cassette of this invention, shown in top oblique view thereof.

FIG. 3 as an alternate embodiment illustrates in an in-part view a broad face 5a of a different cassette typically of the conventional reel design with regard to reel structure 5a shown in this FIG. 3, but embodying the aforenoted inventive features of FIG. 1, except the removable member 2'—comparable to the FIG. 1 embodiment 3a structure, being integrally attached to and a part of the reel structure 5a by virtue of the interconnecting spaced-apart thin spoke-like members 6 interconnecting the removable member and the broad face 5a. There are here illustrated novel structural features of an in-part portion of second female mounting inside diameter dimensions 7 thereof (comparable to diameter(s) 3aa of differing embodiment of FIG. 1), and having an integral but break-away radially outwardly positioned (located) core mounting structure(s) 6 mounting an integrally defining structure of smaller core mounting aperture (through space corresponding to aforenoted inner diameter dimensions 7 thereof of its core reel driver member (spindle) that corresponds to outside diameter 3bb1a (corresponding to 3bb1 of differing embodiment of FIG. 1) of FIG. 1) with regard to inwardly extending key 2a'. After recording evidence on a mounted tape, mounted on the typically conventional reel tape mounting structure (not shown), at a predetermined time, the break-away radially outwardly positioned (located) core mounting structure(s) 6 are manually or by a removal device) broken-away to thereby leave a larger nonbreakaway core mounting aperture (through space) corresponding to inside diameter dimension 3bb of FIG. 1 such that the FIG. 3 reel is thereafter mountable on a conventional tape player having reel core drive (spindle) members corresponding in outer diameter to diameter and/or rewinder, and/or other rewinder and player having feed and take-up reels aligned to correspond to the positioning of the recording cassette of this invention, shown in top oblique view thereof. The thin spoke-like members 6 are of sufficient strength to endure torques of normal drive gear(s) (spindle) and/or feed reels in recording and/or playing of tape mounted on the cassette reel(s)—but sufficiently thin and fragile as to be readily fracturable and breakable by applying excessive force thereto either manually or mechanically such as by a spoke-breaking device, such as described hereinbelow. The material out of which the cassette body 5a and its spokes 6 and removable inner gear drive (spindle) 3aa1 is/are composed may be any conventional plastomer and/or polymer, plastic, or the like such as polystyrene, polyvinylchloride, polypropylene or the like, and/or combinations thereof.

Figure 4:
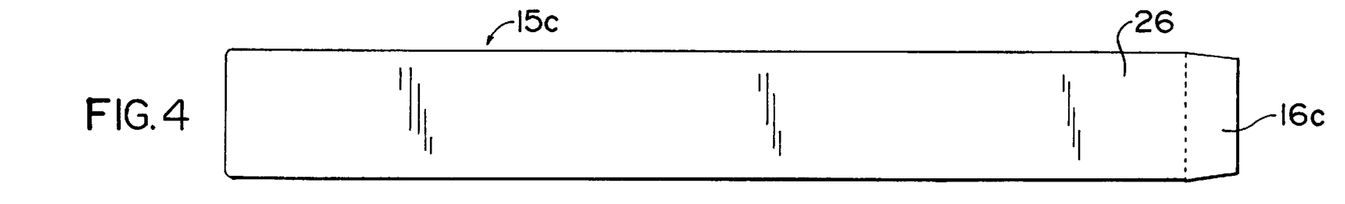
FIG. 4 diagrammatically and symbolically illustrates a friction-mounted feed and/or take-up cassette reel(s) drive (or follower) reel-mounting revolvable member of conventional or other design conventionally drivable or driven, for forceful removal thereof from a cassette reel embodying and within free-space of a larger different cassette reel-mounting structure(s) of different shape and/or size dimensions, shown in top oblique view thereof.

FIG. 4 diagrammatically and symbolically illustrates a friction-mounted feed and/or take-up cassette reel(s) drive or follower gear(s) (spindle(s)) reel mounting revolvable member of the removeable embodiment illustrated in FIG. 1 for each of the drive reel and the follower reel, of otherwise conventional or other design conventionally drivable or driven. The figure illustrates the FIG. 1 embodiment that is removable alterable (modifiable) reel mounting structure(s) 2aa (or 2ba) of FIG. 1, wedge-mounted and adapted for forceful manual and/or device punch-out removal thereof from a cassette reel embodying the same within free space of a larger different cassette reel mounting structure(s) 2a1 and 2a2 of different shape and/or size dimensions as shown in phantom in this Figure, and as shown in full in FIG. 1. The structure 2aa in the illustrated embodiment is wedged against each and both reel structures 2a1 and 2a2. The aforedescribed plurality of spaced-apart wedge points (portions) 2a1 and 2a2 and inside diameter hexagonally joined inner faces 2d are more visibly illustrated for the insert 2aa in this FIG. 4.

Figure 5:
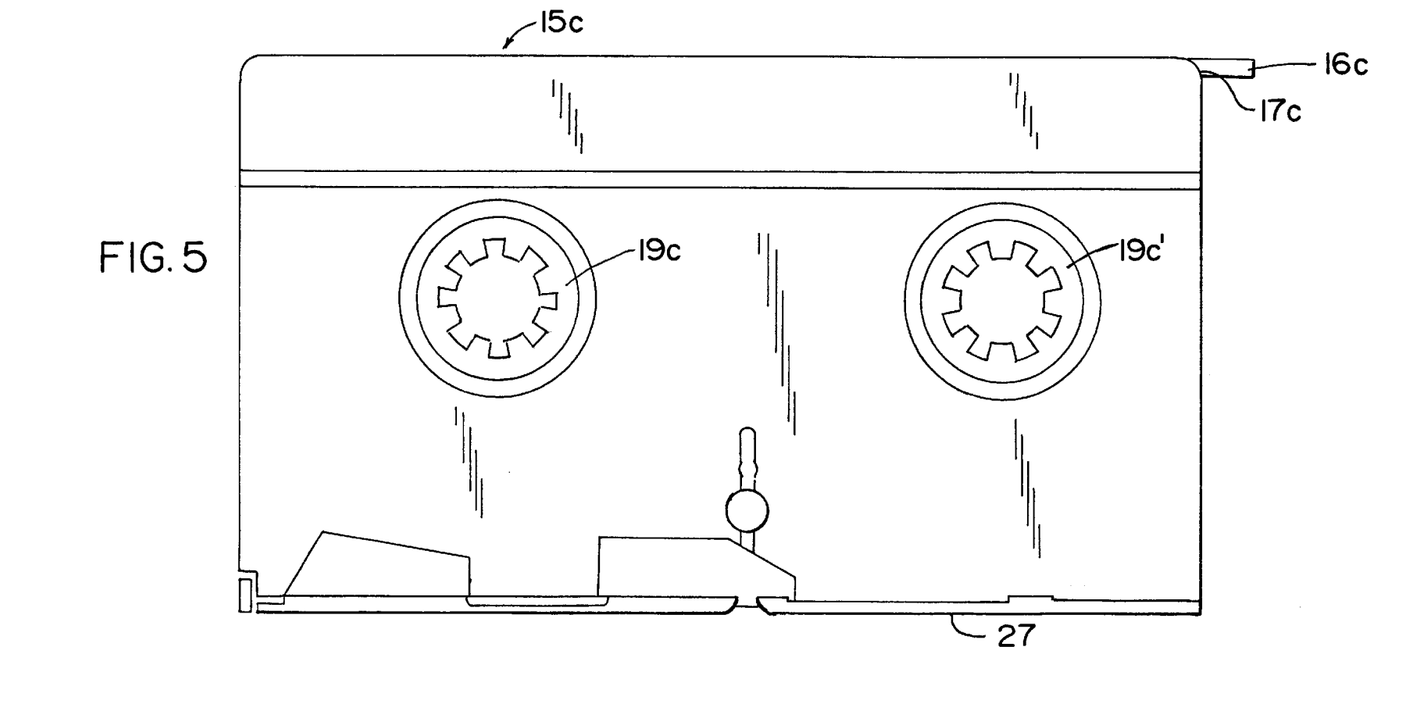
FIG. 5 in an exploded view thereof diagrammatically and symbolically illustrates a device for alternatively either a) storing a pre-recorded cassette tape or alternatively one already recorded partially or fully, and/or potentially (as a part of the combination) a mounted core structure-removal device a core mounting structure removal device for forcefully removing either of a break-away mounting core structure such as that of FIG. 3 or a wedge-mounted core structure for the cassette such as that of FIGS. 1 and 4. Also the removal device includes force-exerting pins or posts of unique designs aiding the treading thereon into the reel's spindle hole (space).
Figures 6, 11:
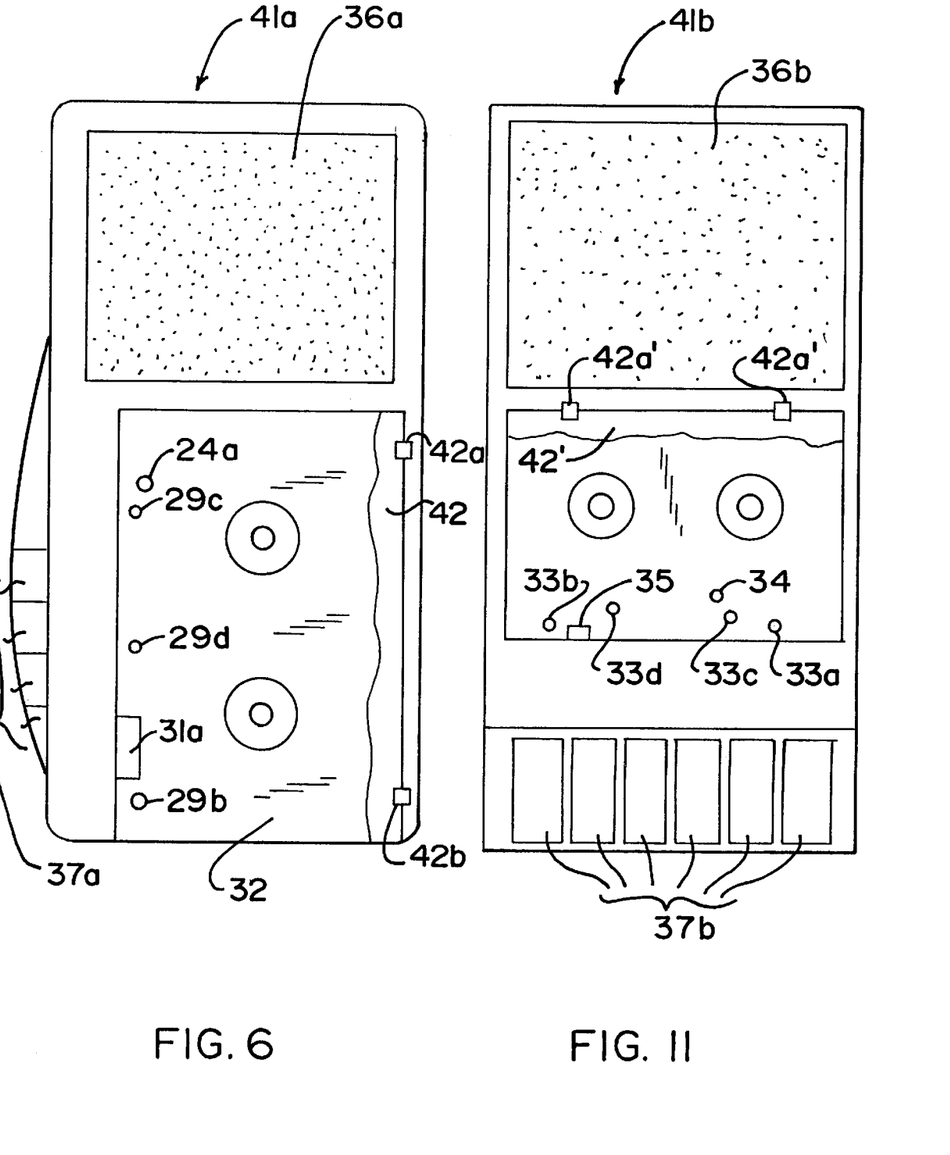
FIG. 6A in an elevation plan view of a broad front side thereof diagrammatically and symbolically illustrates a video cassette of conventional design and mechanism apart from the invention illustrated in the shapes and structures of the feed and drive gears thereof, illustrating the appearance of typically a conventionally well known VHS type.
FIG. 6B in an elevation plan view of a broad front side thereof diagrammatically and symbolically illustrates a different type of video cassette of conventional design and mechanism apart from the invention illustrated in the shapes and structures of the feed and drive gears thereof, illustrating the appearance of typically a conventionally well known type different from that of FIG. 6A.

FIG. 5 in exploded view thereof illustrates a combination device 8 for alternatively either a) by use of a storage device 9 storing a prerecorded cassette tape, or b) alternatively for a cassette reel bearing a tape already recorded partially or fully, and/or potentially (as a part of the greater combination) also inclusive as a mounted core structure removal device 10 inclusive of a core mounting structure removal device for forcefully removing either of a breakaway mounting core structure such as that of FIG. 3 or a wedge-mounted core structure for the cassette such as that of FIGS. 1 and 4. The storage portion 11 is utilizable for storage of the prerecorded or post recorded cassette prior to removal of the member 2a1 and/or 2a2 or the member 2aa, the entire cassette being mountable on the combination of the paired upright members 9a and 9b respectively. The members 9a and 9b respectively each have an outer diameters at least slightly less than diameters 3aa and 3bb respectively of cassette reel gear mounting structures 2a and 2b of FIG. 1, for example—being also typical and representable of other embodiments. The prerecorded or recorded cassette such as 2a and 2b respectively is/are merely slid onto the storage posts 9aa and 9bb, and likewise after the removable central (small) gear mounts 2a and 2b respectively. For removal of the cassette reel gear mounting structures 2a and 2b respectively of FIG. 1, for example, After first lifting the lid 12, removably mountable concurrently on key portions 10aa and 10ba respectively such that when lid 12 is lowered thereon and pressed downwardly thereagainst the mounted cassette, the wedged member 2aa is forceably removed (shifted) as a result of being pressed against upper outer edges (ends) 10ab1 and 10bb1 respectively of the lower portions 10ab and 10bb respectively, or the thereby fractured structures 6 become fractured and sheared and removed (shifted). A cassette's reel and gear drivable portions may be seen and observed during the shearing and/or removal of the portions 22a and 2b through the optional window 12a of lid 12. In each or either case there remains thereafter left solely the remainder of the reel in good operative condition, of a remaining size and hole diameter ready to be mounted on and rewound by an appropriately sized tape typically conventional rewinding machine and thereafter played on a typically conventional tape playing cassette machine or other tape playing machine having appropriately sized drive gear(s) (spindles)—typically utilizing a conventional cassette tape player or other conventional tape player. While in this illustrated FIG. 5 there is shown a total device 8 inclusive of two separate but interconnected portions thereof, namely portion 9 and portion 10, the portion 9 being directed to the utility of storage and/or serving as a transporting case, and the portion 10 being directed to the utility of removal from its fixed-state and position of the inner gear-receiving detachable (removable) structures such as 2a, 3b, and 2', the total device 8 may be subdivided into two separate independent boxes, each with its separate utility. However, as a single unit 8, there is provided a unitary operational kit providing both convenience and meeting necessity of both storage and easy and handy conversion potential for conversion of a cassette reel of this invention from its recording state inclusive of the removable gear-mounting center, to the conventional form playable on a conventional cassette or other conventional tape player. The reel center-removal device 10 includes reel-center removal posts 10a and 10b. The upper portion 10aa of post 10a has an outer diameter at-least slightly lesser than a conventionally sized cassette reel such as 3bb1 of FIG. 1, and likewise the upper portion 10ba of post 10b has an outer diameter at-least slightly lesser than a conventionally sized cassette reel also such as 3bb1 of FIG. 1. The outer diameters of lower portions 10ab and 10bb each and both respectively is/are of greater outer diameter than 3aa and 3bb respectively of cassette reel gear mounting structures 2a and 2b of FIG. 1, for example—such that after mounting thereon the cassette reel carrying the removable gear-mounting portions 2a and 2b having aforenoted smaller inside diameter, thereafter when the lid 12 is pivotably closed downwardly sufficiently to press downwardly onto an upper broad side of the cassette, the threadable hole(s) of the removable gear-mounting portions 2a and 2b (for example) will become threaded by the post members 9a and 9b. As a further utility of the tape storage portion 9, the mounting post members 9a and 9b aforenoted, are of sufficiently small cross-section to be utilizable for the mounting thereon of the cassette of the present invention inclusive of aforenoted reels having removable small gear mounts (such as aforenoted 5, 5' 6A and 6B) of a cassette recorder as discussed above. However, the small post members naturally are also utilizable for continued mounting of the cassette inclusive of its reels "after" removal the small gear mount-structures (aforenoted 2a, 3b, and 2'. Moreover, the FIG. 5 further illustrates preferred embodiments of such mounting posts 9a, 9b, 10aa and 10bb each and/or all have pointed upper ends that facilitate easy mounting of the tape cassette thereon. The lid 12 has mounting holes 14 and 14' at opposite ends thereof positioned for pivotal swinging lid 12 on mounting pegs 12a and 12a' extending endwardly, outer end(s) thereof being 13a', and likewise lid 11 having mounting mounting pegs 12a and 12a' at opposite ends, and outer ends 15 and 15' thereof, for pivotally swinging the lid 11 thereon. Members 16a (and outer mounted end 16a thereof) and 17 (and outer mounted end 17a thereof) are wedge members which wedge temporarily retainably against the outer upper faces 10x1 and 10x2 when respectively the lids 11 and 12 are downwardly pressed. The storage compartment preferably carries identifying indicia 9c such as the words "TO STORE" visibly on the floor 9c of the storage portion 9, and likewise identifying indicia 10csuch as to the words "TO ALTER" visibly on the floor of 10c of the reel-altering portion 10.

FIG. 6A in an elevation plan view of a broad front side thereof diagrammatically and symbolically illustrates a video cassette of conventional design and mechanism apart from the invention illustrated in the shapes and structures of the feed and drive gears (spindles) thereof, illustrating the appearance of typically a conventionally well known VHS type.

FIG. 6B in an elevation plan view of a broad front side thereof diagrammatically and symbolically illustrates a different type of video cassette of conventional design and mechanism apart from the invention illustrated in the shapes and structures of the feed and drive gears (spindle(s)) thereof, illustrating the appearance of typically a conventionally well known type different from that of FIG. 6A.

Figures 7, 8:
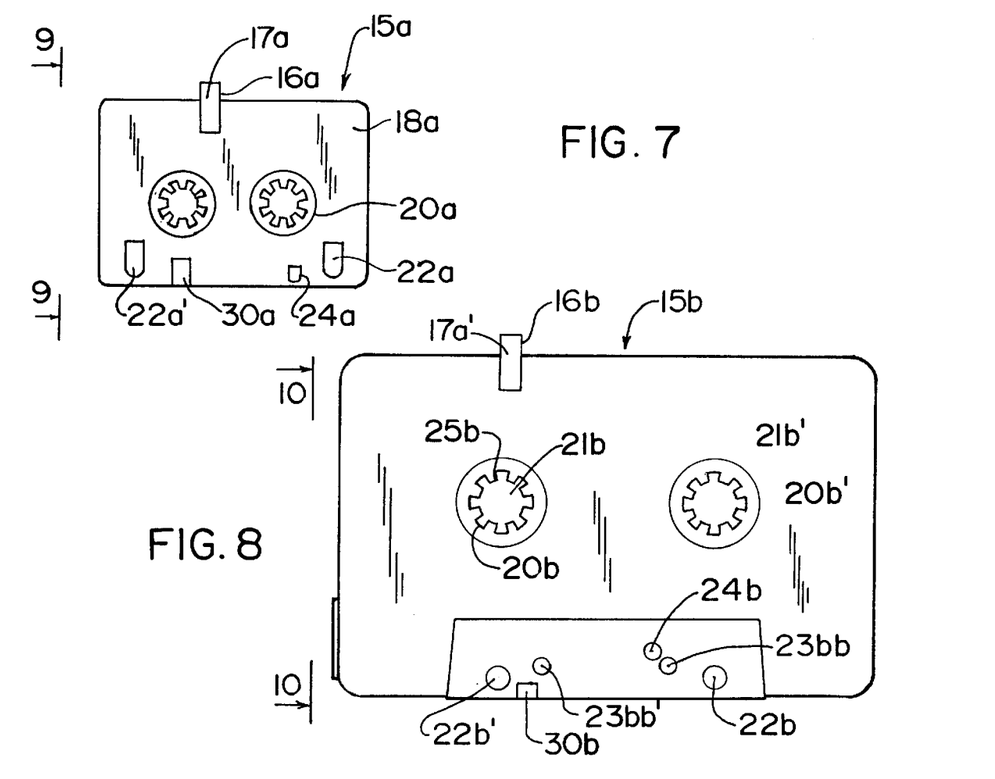
Figure 9:
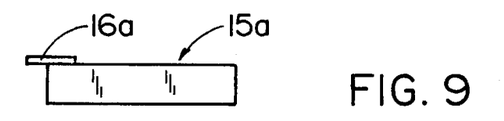
Figure 10:
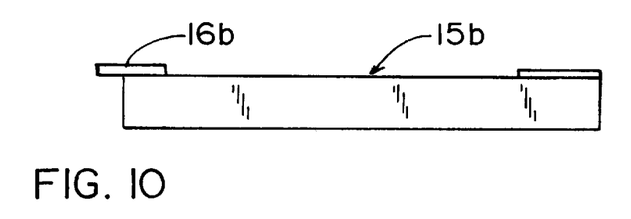
Figure 12:
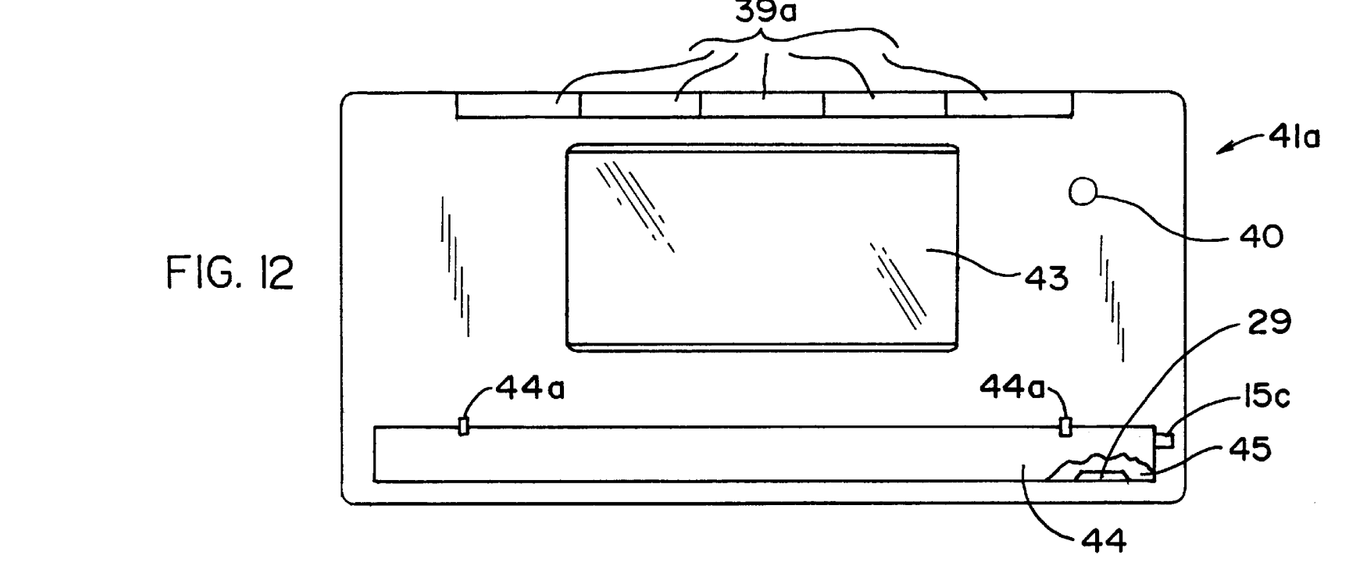

FIG. 7 illustrates in elevation plan view, a novel audio-vidio recorder 24 in a novel combination with cassette 25 having novel driver reel spindle 3a" and follower reel spindle 3a' and drive reel 2a' and following feeder reel 2b' and novel drive spindle gear 3a" and novel feeder spindle gear(s) 3b' thereof. In this particular illustrated embodiment, the spindle gears 3a" and 3b' are non-aligned in the same sense of non-aligned illustrated in FIG. 1 for the cassette thereof, likewise here for the illustrated video cassette's mounted reels. In a greater combination thereof, there are included and illustrated conventional elements inclusive of recording circuitry (and box thereof) 37, conventional recording head(s) 28, conventional recording tape 19', conventional driving mechanism such as driving spindle-brake 26, reel driving belt 30 and motor driving gear 27 and driven gear 29 and motor 31 and battery 38 and electrical switch (for turning on and off power to the motor 31) and microphone 35 and video camera 36 and various circuitries thereof, and negative lead 34 and positive lead 33 and battery 38. It will moreover be noted that this driver motor 31 drives drive gear 27 in solely one direction, no reverse—i.e. no rewind driving belt by which the feeder/following reel 2b' could be rewound on nor by the audio-video recorder 24 as previously already described.

The cassette cases, i.e. reels, of this invention while using conventional technology, differ in the aforenoted ways . . . i.e. structural arrangements and shapes. Likewise, the sizes thereof normally and typically correspond to the conventional miniature audio cassettes for audio recording, and correspond normally and typically conventional miniature video cassettes, in size and shape(s). The following tables illustrates typical size and dimension data:

TABLE I

| Case Dimensions | Video | Standard-audio | Micro-audio |
| --- | --- | --- | --- |
| WIDTH | 4 & 1/16" | 2 & 1/2" | 1 & 5/32" |
| LENGTH | 7 & 1/8" | 3 & 15/16" | 1 & 15/16" |
| DEPTH | 1" | 15/32" (front) 5/16" (back) | 5/16" |

TABLE II

| Spool Dimensions | Video | Standard-audeo | Micro-audio |
| --- | --- | --- | --- |
| Diameter | 3/32" | 7/8" | 1/2" |
| Depth | 5/8"(o.d.) 1/2"(i.d.) | 9/64" | 3/8"(i.d.) |
| I/D/Sprocket | 11/16" | 3/8" | 5//32" |

TABLE II-continued

| Spool Dimensions | Video | Standard-audeo | Micro-audio |
| --- | --- | --- | --- |
| # of Teeth | 9 | 6 | 6 |

TABLE III

| Spool Dimensions | Vidio | Standard-audio | Micro-audio |
| --- | --- | --- | --- |
| Width | 1/2" | 5/32" | 5/32" |
| Length | 239.8 m(*1) | 86.4 m(*2) | 2.16 m(*3) |

(*1)Based on standard T-120 tape on short play @ 3.33 cm/sec.
(*2)Based on standard D60 cassette tape @ 4.8 cm/sec.
(*3)Based on standard M60 microcassette @ 1.2 cm/sec.

It is within the scope of the invention to make variation, substitution of equivalents and/or modifications within the skill of an ordinary artisan in this particular technology.

I claim:

1. In a tape-mounting reel having a core with first radially inwardly directed core structure defining (a) a first radially outwardly annularly circumscribing tape mounting structure having a first radially outwardly facing tape-receiving circumscribing surface thereof mountable of tape wound or windable thereon and (b) at-least one first radially inwardly directed core female bearing hub structure mountedly interconnected to said first radially outwardly annularly circumscribing tape mounting structure and engageable with and drivable by or rotatable with at-least one first revolvable spindle drive gear bearing surface of a tape playing machine such that the tape-mounting reel is revolvably drivable by or revolvably rotatable with said at-least one first revolvable spindle drive gear bearing surface, and the at-least one first radially inwardly directed core female bearing hub structure having a first predetermined radius operatively mountable on a heretofore commercially standardized tape player spindle drive gear bearing surface and inner radius of said standardized tape player drive gear bearing surface, an improvement comprising in combination: said core having (a) a second radially outwardly annularly circumscribing reel support structure being by intermittent attachment means retainably connected to and supported by and substantially non-reattachable to said radially outwardly facing tape-receiving circumscribing surface and (b) second radially inwardly directed core female bearing structure that is at-least one of engageable with and drivable by or rotatable with at-least one engageable second revolvable spindle drive gear bearing surface such that a first tape mounting reel is revolvably drivable by said at-least one engageable second revolvable spindle drive gear bearing surface when the second radially inwardly directed core female bearing structure is engageably mounted on said at-least one engageable second revolvable spindle drive gear bearing surface, the second radially inwardly directed core female bearing structure having a differing mountable design feature and mechanism thereof from that of said first radially inwardly directed core female bearing structure.

2. The improvement of claim 1, in which said improvement further includes said differing design feature and mechanism thereof comprises a second predetermined radius being of lesser radius dimension than said first predetermined radius.

3. The improvement of claim 2, in which said improvement further includes said second radially inwardly directed core female bearing structure being detachably separable from said first radially outwardly annularly circumscribing tape mounting structure such that after separation therefrom, said first radially inwardly directed core female bearing structure being enabled to be placed in meshing and drivable contact with said first revolvable spindle drive gear bearing surface.

4. The improvement of claim 3, in which said improvement further includes the second radially inwardly directed core female bearing structure having a shape and radius size mountable on a video tape reel.

5. In a cassette tape-reel mounting and playing machine, the improvement further including a feed spindle mountable and feedable of the tape-mounting reel of claim 4 and a reel-drive mechanism consisting of a drive mechanism driveably connected exclusively to a tape-receiving reel-drive spindle.

6. The improvement of claim 3, in which said improvement further includes the first radially inwardly directed core female bearing structure having a shape and radius size mountable on a audio tape reel.

7. In a cassette tape-reel mounting and playing machine, the improvement further including a feed spindle mountable and feedable of the tape-mounting reel of claim 6 and a reel-drive mechanism consisting of a drive mechanism driveably connected exclusively to a tape-receiving reel-drive spindle.

8. In a cassette tape-reel mounting recording machine, the tape-mounting reel of claim 3, the improvement in further combination including: a tape-mountable tape feed-reel revolvable spindle gear bearing surface mountable and revolvable of said second radially inwardly directed core female bearing structure; and a tape-mountable tape receivable-reel revolvably-drivable spindle drive gear bearing surface; and a first one of said tape-mounting reel; and a second one of said tape-mounting reel; and in said first one of said tape-mounting reel, said first radially inwardly directed core female bearing hub structure being of a different diameter than said second radially inwardly directed core female bearing surface.

9. In a cassette tape-reel mounting recording machine of claim 8, the improvement in further combination including the first radially inwardly directed core female bearing structure having jointly a shape and radius of a video tape reel design.

10. In a cassette tape-reel mounting recording machine of claim 8, the improvement in further combination including the first radially inwardly directed core female bearing structure having jointly a shape and radius of a audio tape reel design.

11. In the tape-mounting reel of claim 8, said intermittent attachment means comprising weak fracturable joining structure attaching said second radially outwardly annularly circumscribing reel support structure to said radially outwardly facing tape-receiving circumscribing surface.

12. In the tape-mounting reel of claim 8, said intermittent attachment means comprising weak fracturable joining structure attaching said second radially outwardly annularly circumscribing reel support structure to said radially outwardly facing tape-receiving circumscribing surface.

13. In the tape-mounting reel of claim 8, said intermittent attachment means comprising radially-inwardly friction-fit structure of said second radially outwardly annularly circumscribing reel support structure having retainably wedged thereagainst radially-outwardly friction-fit structure of said radially outwardly facing tape-receiving circumscribing surface.

14. In the tape-mounting reel of claim 8, said intermittent attachment means comprising radially-inwardly friction-fit structure of said second radially outwardly annularly circumscribing reel support structure having retainably wedged thereagainst radially-outwardly friction-fit structure of said radially outwardly facing tape-receiving circumscribing surface.

15. In the tape-mounting reel of claim 3, said intermittent attachment means comprising weak fracturable joining structure attaching said second radially outwardly annularly circumscribing reel support structure to said radially outwardly facing tape-receiving circumscribing surface.

16. In the tape-mounting reel of claim 3, said intermittent attachment means comprising radially-inwardly friction-fit structure of said second radially outwardly annularly circumscribing reel support structure having retainably wedged thereagainst radially-outwardly friction-fit structure of said radially outwardly facing tape-receiving circumscribing surface.

17. In a cassette tape-reel mounting and playing machine, the improvement further including a feed spindle mountable and feedable of the tape-mounting reel of claim 3 and a reel-drive mechanism consisting of a drive mechanism driveably connected exclusively to a tape-receiving reel-drive spindle.

18. In a tape-mounting reel of claim 3, the improvement further including: a) two of said tape-mounting reels as a feed reel and as a drive reel; and b) a recording tape embodying recording means for recording at-least one of audio and video data, and having a feed-end nondetachably anchored to said feed reel end and a drive end nondetachably anchored to said drive reel.

19. The improvement of claim 2, in which said improvement further includes the second radially inwardly directed core female bearing structure having a shape and radius size mountable on a video tape reel.

20. In a cassette tape-reel mounting and playing machine, the improvement further including a feed spindle mountable and feedable of the tape-mounting reel of claim 19 and a reel-drive mechanism consisting of a drive mechanism driveably connected exclusively to a tape-receiving reel-drive spindle.

21. The improvement of claim 2, in which said improvement further includes the first radially inwardly directed core female bearing structure having a shape and radius size mountable on a audio tape reel.

22. In a cassette tape-reel mounting and playing machine, the improvement further including a feed spindle mountable and feedable of the tape-mounting reel of claim 21 and a reel-drive mechanism consisting of a drive mechanism driveably connected exclusively to a tape-receiving reel-drive spindle.

23. In a cassette tape-reel mounting recording machine, the tape-mounting reel of claim 2, in which the improvement in further combination includes: a tape-mountable tape feed-reel; revolvable spindle gear bearing surface mountable and revolvable of said second radially inwardly directed core female bearing structure; and a tape-mountable tape receivable-reel revolvably-drivable spindle drive gear bearing surface; and a first one of said tape-mounting reel; and a second one of said tape-mounting reel.

24. In a cassette tape-reel mounting and playing machine, the improvement further including a feed spindle mountable and feedable of the tape-mounting reel of claim 2 and a reel-drive mechanism consisting of a drive mechanism driveably connected exclusively to a tape-receiving reel-drive spindle.

25. In a tape-mounting reel of claim 2, the improvement further including: a) two of said tape-mounting reels as a feed reel and as a drive reel; and b) a recording tape embodying recording means for recording at-least one of audio and video data, and having a feed-end nondetachably anchored to said feed reel end and a drive end nondetachably anchored to said drive reel.

26. In a cassette tape-reel mounting recording machine, the tape-mounting reel of claim 1, in which the improvement in further combination includes: a tape-mountable tape feed-reel revolvable spindle gear bearing surface mountable and revolvable of said second radially inwardly directed core female bearing structure; and a tape-mountable tape receivable-reel revolvably-drivable spindle drive gear bearing surface; and a first one of said tape-mounting reel; and a second one of said tape-mounting reel.

27. In the tape-mounting reel of claim 26, said intermittent attachment means comprising weak fracturable joining structure attaching said second radially outwardly annularly circumscribing reel support structure to said radially outwardly facing tape-receiving circumscribing surface.

28. In the tape-mounting reel of claim 26, said intermittent attachment means comprising radially-inwardly friction-fit structure of said second radially outwardly annularly circumscribing reel support structure having retainably wedged thereagainst radially-outwardly friction-fit structure of said radially outwardly facing tape-receiving circumscribing surface.

29. In a cassette tape-reel mounting and playing machine, the tape-mounting reel of claim 3, the improvement in further combination including: a tape-mountable tape feed-reel revolvable spindle gear bearing surface mountable and revolvable of said second radially inwardly directed core female bearing structure; and a tape-mountable tape receivable-reel revolvably-drivable spindle drive gear bearing surface; and a first one of said tape-mounting reel; and a second one of said tape-mounting reel.

30. In a cassette tape-reel mounting and playing machine of claim 29, the improvement in further combination including the first radially inwardly directed core female bearing structure having jointly a shape and radius of a conventionally utilized video tape reel design.

31. In a cassette tape-reel mounting and playing machine of claim 29, the improvement in further combination including the first radially inwardly directed core female bearing structure having jointly a shape and radius of a conventionally utilized audio tape reel design.

32. In the tape-mounting reel of claim 29, said intermittent attachment means comprising weak fracturable joining structure attaching said second radially outwardly annularly circumscribing reel support structure to said radially outwardly facing tape-receiving circumscribing surface.

33. In the tape-mounting reel of claim 29, said intermittent attachment means comprising radially-inwardly friction-fit structure of said second radially outwardly annularly circumscribing reel support structure having retainably wedged thereagainst radially-outwardly friction-fit structure of said radially outwardly facing tape-receiving circumscribing surface.

34. In the tape-mounting reel of claim 1, said intermittent attachment means comprising weak fracturable joining structure attaching said second radially outwardly annularly circumscribing reel support structure to said radially outwardly facing tape-receiving circumscribing surface.

35. In the tape-mounting reel of claim 1, said intermittent attachment means comprising radially-inwardly friction-fit structure of said second radially outwardly annularly circumscribing reel support structure having retainably wedged thereagainst radially-outwardly friction-fit structure of said radially outwardly facing tape-receiving circumscribing surface.

36. In a cassette tape-reel mounting and playing machine, the improvement further including a) a feed spindle mountable and feedable of the tape-mounting reel of claim 1 and b) a reel-drive mechanism consisting of a drive mechanism driveably connected exclusively to a tape-receiving reel-drive spindle.

37. In a tape-mounting reel of claim 1, the improvement further including: a) two of said tape-mounting reels as a feed reel and as a drive reel; and b) a recording tape embodying recording means for recording at-least one of audio and video data, and having a feed-end nondetachably anchored to said feed reel end and a drive end nondetachably anchored to said drive reel.

38. In the tape-mounting reel of claim 1, as an improvement thereon, said intermittent attachment means including a separate break-away inner tape reel core means for forceably breaking-away reel core spindle-mounting structure from the first radially outwardly annularly circumscribing tape mounting structure, said break-away inner tape reel core means including reel core aperture threading structure and pressure exertable broadened structure non-passable through a reel core aperture or said break-away inner tape reel core means, said break-away inner tape reel core means being transmittable of break-away pressure onto the reel core spindle-mounting structure.

39. In the tape-mounting reel of claim 38, a further improvement comprising said break-away inner tape real core means including a pressing means for exerting sufficient pressure when pressed downwardly against a top face of a reel mounted on the reel core aperture threading structure, causes the pressure exertable broadened structure to break-away said first radially inwardly directed core female hub bearing structure.

40. In the tape-mounting reel of claim 38, a further improvement comprising said break-away inner tape reel core means including a pressing means for exerting sufficient pressure and sufficient storage space of space-dimensions sufficient for storage of at least one of a tape reel and a cassette reel therein.

41. In a tape-mounting reel of claim 38, the break-away inner tape reel core means including a plurality of first and second spaced-apart ones of the reel core aperture threading structure and the pressure exertable broadened structure, spaced-apart a distance corresponding to distance between drive and feeder core spaces of a break-away cassette reels core spindle-mounting structures mountable thereon, such that the spaced-apart break-away inner core spindle-mounting structures are substantially concurrently and simultaneously removable when pressure is applied to said break-away inner tape reel core means of a mounted cassette reel.

\* \* \* \* \*